Figures 12, 14, 15, 16, 17:
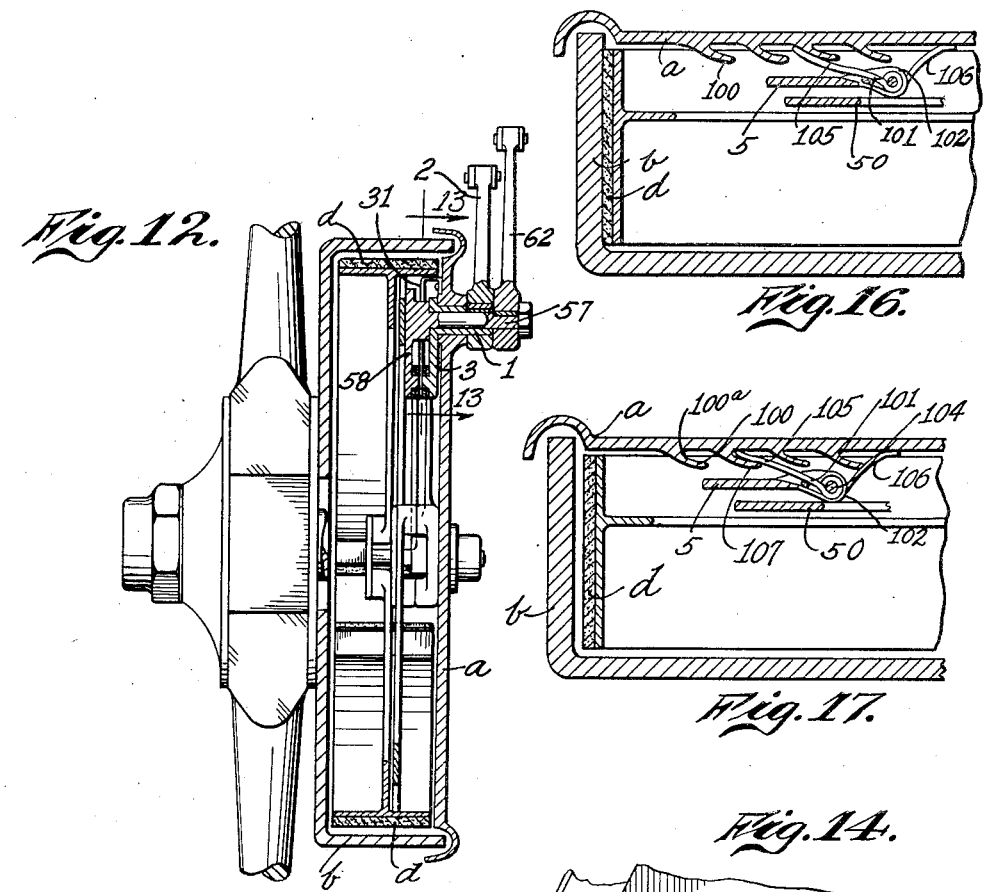

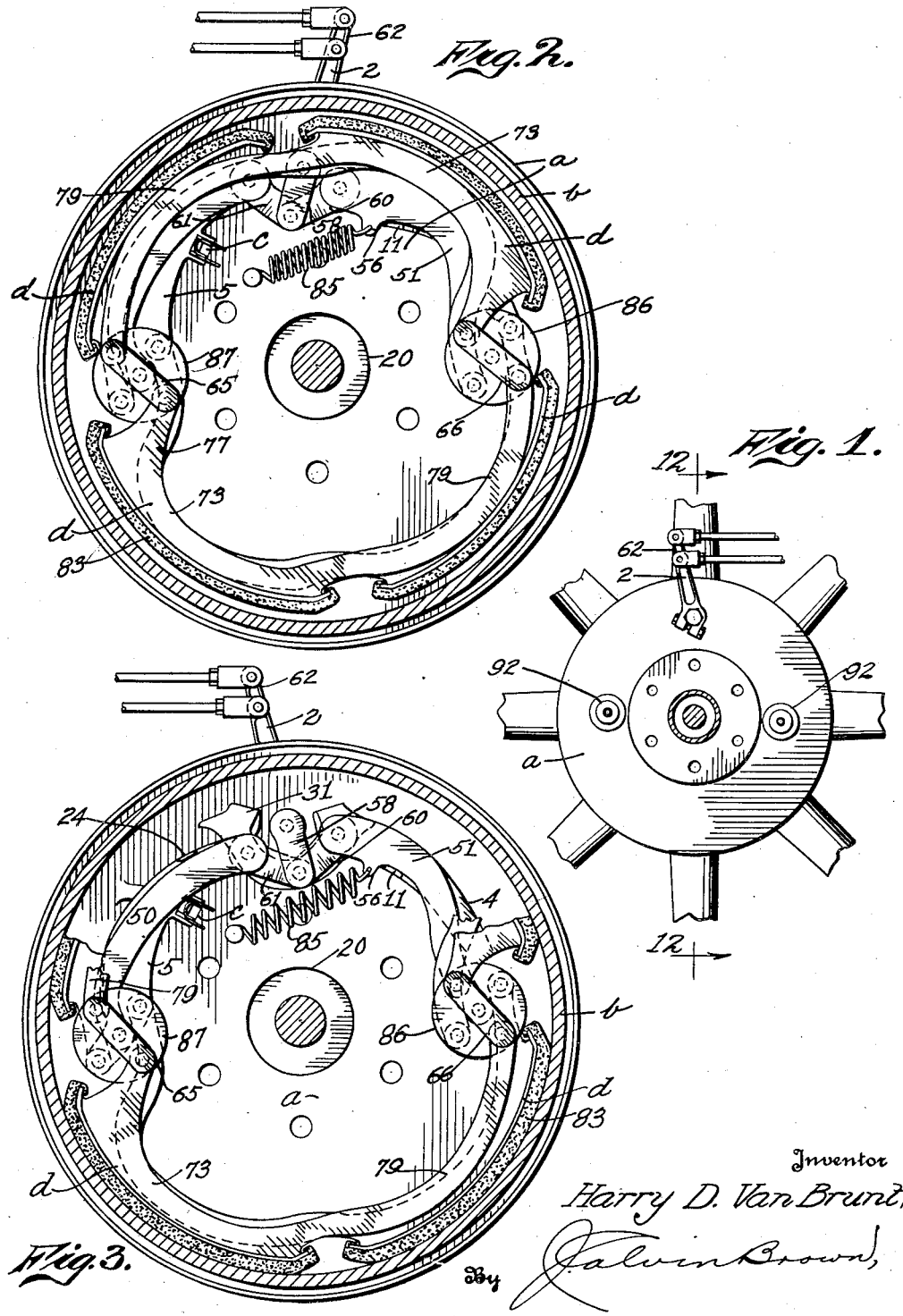

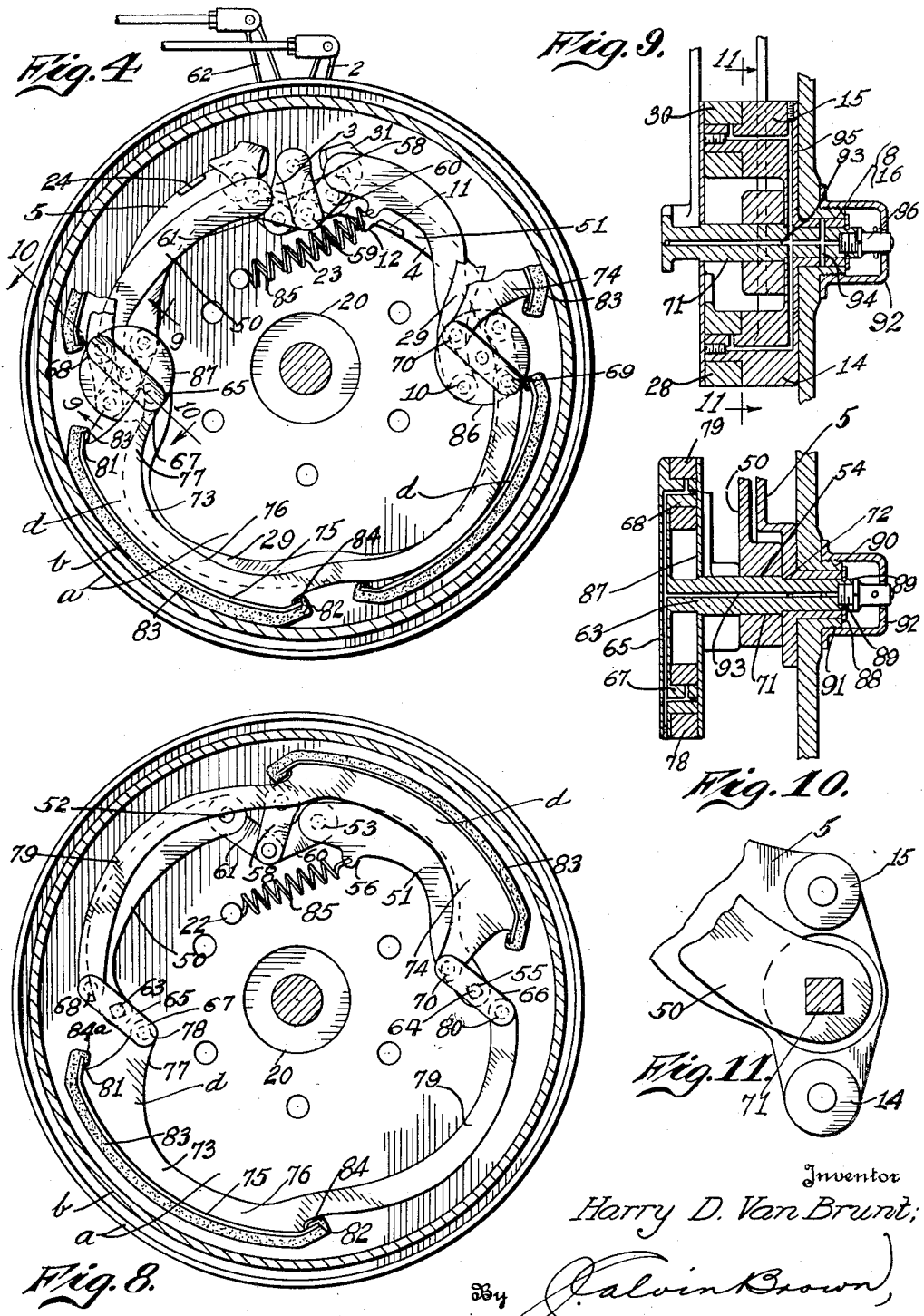

Dec. 11, 1934. H. D. VAN BRUNT 1,984,348
BRAKE
Filed May 12, 1930 4 Sheets-Sheet 3
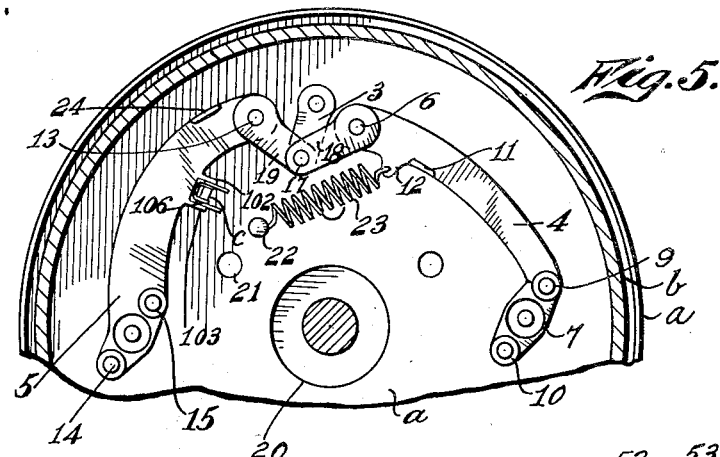
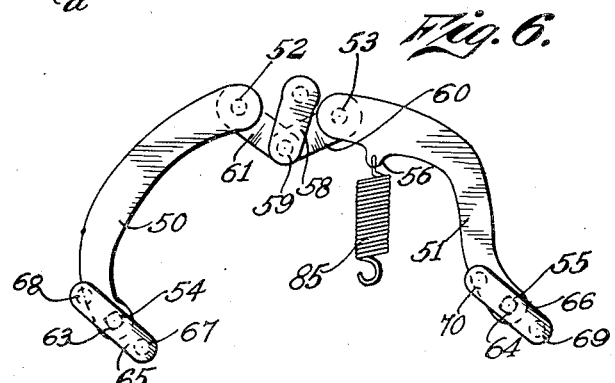
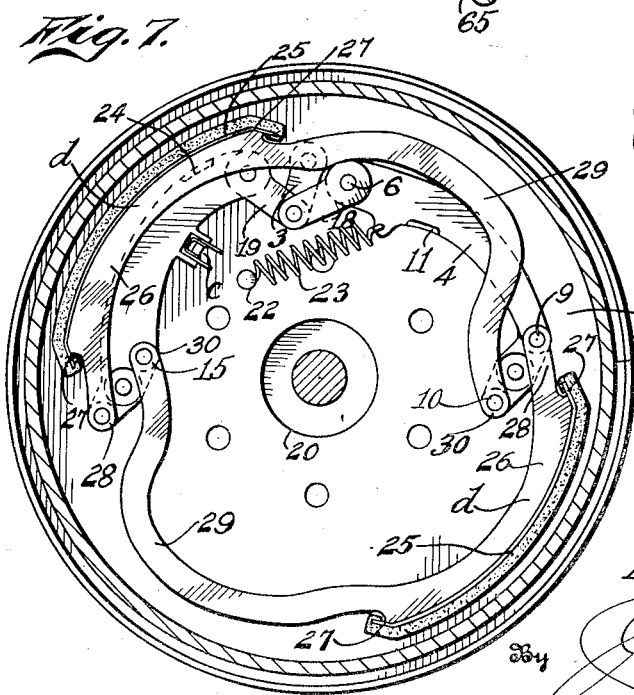
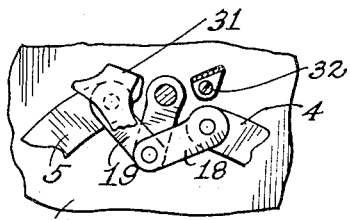
Inventor,
Harry D. Van Brunt,
By Calvin Brown,
Attorney.

Dec. 11, 1934. H. D. VAN BRUNT 1,984,348
BRAKE
Filed May 12, 1930 4 Sheets-Sheet 4

Inventor
Harry D. Van Brunt;
By Calvin Brown,
Attorney

Patented Dec. 11, 1934

1,984,348

UNITED STATES PATENT OFFICE 1,984,348

BRAKE

Harry D. Van Brunt, Los Angeles, Calif.

Application May 12, 1930, Serial No. 451,604

8 Claims. (Cl. 188—78)

This invention relates to improvements in brakes, for use on vehicles such as aeroplanes, automobiles, and the like.

The invention has for an object the provision of a device which combines both a service brake and what may be termed a parking or emergency brake. The present invention contemplates an improvement over the invention shown and described in the application of Charles C. Higgins and Harry D. Van Brunt, Serial No. 269,209, filed April 11, 1928, in the United States Patent Office.

The invention has for a further object the provision of a brake which, in the present instance, may utilize four brake shoes with the brake shoes so arranged that all four thereof may be actuated simultaneously, or a selected two thereof operated simultaneously, the other two not moving.

Another object is the provision of a brake so arranged that wear in the brake lining is automatically compensated for so that the brake at all times functions most efficiently without the need of manual brake adjustments by a mechanic.

Another object is the provision in a brake of means whereby the clearance between the brake shoe and brake drum is maintained substantially constant when the brake is not in operation and regardless of the wear of the brake lining.

Another object is the provision of an automatic take up for brake shoes which is directly associated with one or more of said shoes.

In the present invention, I am not concerned with pedal height because I have provided a novel mechanism whereby as the brake lining is worn, the means for moving the brake into drum engagement has a means for regulating the first means as to degree of movement. The brake is admirably adapted for use with segmental brake shoes arranged or grouped in a certain relation and I preferably arrange the brake shoes in segmental relation for several reasons,—there is better dissipation of heat, more efficient braking action in that the brake shoes may be brought into drum engagement in a more uniform manner. The present brake works efficiently whether the vehicle is moving forwardly or backwardly and the brake does not depend for its efficiency upon any frictional engagement of a part with a rotating member, such as a brake drum, and which part by said frictional engagement is adapted to carry other parts to bring said parts into cooperation with the brake drum. With my invention, the segmental brake shoes are actuated substantially in a radial line toward the drum. The present brake may be utilized with any hydraulic system, sylphon system, or straight mechanical operation.

The invention has few parts to get out of order and the brake may be assembled by any ordinary mechanic although when the assemblage of the various units is once made, adjustments, if necessary, may be readily made exterior of the brake.

The invention provides a brake which is inexpensive of manufacture, fool-proof in operation, easily assembled, does not require frequent attention, is automatically adjustable for brake clearance, and which is generally superior to existing brakes so far as the inventor is aware.

With the above and other objects in view, the invention consists in the novel and useful provision, formation, construction, association, and relative arrangement of parts, members and features, all as shown in certain embodiments in the accompanying drawings, described generally, and more particularly pointed out in the claims.

In the drawings:

Figure 1 is a fragmentary side elevation showing a brake drum carrier plate adapted to be attached to an axle housing or axle and a spoke wheel adapted to carry a drum for cooperation with said plate, Figure 2 is a vertical sectional view of the brake mechanism, the brake shoes being out of brake drum engagement, this being an assembled view, Figure 3 is a view similar to Figure 2, the brake shoes being actuated into brake drum engagement, Figure 4 is a vertical sectional view similar to Figures 2 and 3 showing one of the brake shoes and a fragment of a diametrically opposite brake shoe in brake drum engagement, the other two shoes being out of drum engagement, Figure 5 is a fragmentary vertical sectional view of certain foundation mechanism utilized in the brake mechanism, Figure 6 is a plan view of certain other brake mechanism for actuating certain of the brake shoes, Figure 7 is a vertical sectional view showing two of the brake shoes utilizing the mechanism shown in Figure 5, Figure 8 is a vertical sectional view showing an assemblage of shoes with the mechanism shown in Figure 6, Figure 9 is a cross sectional view on the line 9—9 of Figure 4, Figure 10 is a cross sectional view on the line 10—10 of Figure 4, Figure 11 is a fragmentary view, partly in section, of a relationship that exists between the mechanism shown in Figures 5 and 6, Figure 12 is a cross sectional view on the line 12—12 of Figure 1, Figure 13 is a fragmentary view of a portion of the mechanism shown in Figure 5, the said view being taken on the line 13—13 of Figure 12, Figure 14 is a fragmentary plan view of a take-up mechanism for the brake shoes, Figure 15 is a sectional view on the line 15—15 of Figure 14, and, Figures 16 and 17 are fragmentary cross sectional views of the take-up mechanism.

Referring now to the drawings, and for clearness of description, I shall for convenience describe separately certain brake units, thereafter showing how said brake units cooperate. I have what I may term primary and secondary brake systems which, when combined, produce what I term a service brake. The secondary brake system alone may provide a parking or an emergency brake although, as stated, the secondary system forms a part of the service system, although the secondary system is operable independent of the primary system.

In the several drawings, I have shown by way of initially explaining the invention, four segmental brake shoes. All four shoes are adapted to cooperate with a drum and the brake is of the commonly designated internally expanding type. When all of the shoes operate against the brake drum, I have the service brake system. I also provide mechanism which will operate any one or several of the brake shoes less than all of said brake shoes, and this I term the secondary system. The secondary system operates independent of the service brake system although when the service brake system is operated, both the primary system and secondary system are immediately brought into service.

By way of simple explanation, I have provided four brake shoes segmental in character and which brake shoes are adapted to move substantially in a radial path to evenly engage the interior of a brake drum. When the service system is operated, all of the brake shoes move outwardly into drum engagement and when the secondary system or parking system is operated, diametrically opposite brake shoes are brought into drum engagement. Therefore, the only difference between the two systems consists in the number of brake shoes actually used to perform a braking operation. In the service system, I have provided through the simple expedient of a rack and pawl, means whereby limited movement is provided the brake shoes so that when the brake lining wears to a given degree, the pawl will move relative to the rack so as to engage a different rack tooth and, as a result, change the position of the brake shoes, in that the brake shoes are maintained closer to the drum as each operation of the pawl takes place than they were initially when the lining was new.

The primary brake system will be described first, and reference is now directed to Figures 5 and 7 wherein $a$ is the carrier plate for the brake mechanism, and $b$ the brake drum. Adapted to be passed through the carrier plate is a tubular shaft 1 (see Figure 12) and exterior of said plate and keyed to said shaft is a lever arm 2. This shaft carries an arm 3. Adjacent the inner surface of the carrier plate are primary actuating levers 4 and 5. The lever 4 carries a projecting stud 6 at one end and the opposite end has an angular part 7 relative to the general length of the lever which is adapted to have a hollow shaft 8 projecting from one surface thereof (see Figure 9) and a pair of spaced studs 9 and 10 projecting from the opposite surface thereof. The lever 4 is likewise provided with an upstanding flange or stop 11 adjacent one edge thereof, and likewise said lever is provided with a perforated lug 12. The lever 5 is provided at one end with a stud 13, and the opposite end portion of said lever is provided with a pair of spaced, upstanding studs 14 and 15 and with a shaft 16 extending from the opposite surface of said lever, this shaft being identical in form with the shaft 8. The take-up mechanism $c$ is associated with the lever 5, but said take-up mechanism will not be described at present.

The lever 3 carries a stud 17 adjacent the extremity thereof and carried on said stud is a pair of links 18 and 19 which links likewise are secured to the studs 6 and 13 of the levers 4 and 5.

As a brief résumé, the center of the carrier plate is shown at 20 and the shafts 8 and 16 for both levers are diametrically opposite relative to the center of the carrier plate, and the shaft 1 is located substantially 90° from the shafts 8 and 16. It is perhaps unnecessary to state that the carrier plate is adapted to be bolted or otherwise secured to the axle or its housing, holes 21 being provided in the carrier plate so that said plate may be bolted to the axle housing. A pin 22 is secured to the carrier plate and a coil spring 23 is secured to said pin and likewise to the perforated ear or lug 12. Thus, the arm 4 is caused to move inwardly toward the center 20 of the carrier plate or, in other words, the tendency is to produce counter-clockwise rotation of the arm using the shaft 8 as a center. This movement, of course, causes rotation of the arm 3 and its shaft 1 due to the fact that the lever 4 is secured by means of a link 18 to the arm 3. The lever 5 is likewise, through the medium of the link 19, secured to the arm 3 and consequently, this lever has a tendency to rotate anti-clockwise from the position of the parts shown in Figure 5 about its shaft 16. The lever 5 is provided with a stop or flange 24 adjacent what may be termed the top edge thereof. In this respect, the stop or flange 11 is along the bottom edge of the lever 4. This mechanism just described constitutes in the levers 4 and 5 what I term the primary actuating levers and these levers may be actuated through the medium of the lever 2.

Adapted to cooperate with the levers 4 and 5 are the primary brake shoes $d$ shown in Figure 7. These primary shoes are diametrically arranged and identical in construction; hence, one thereof will be described, like reference characters applying to the other. Said shoe includes a segmental flange 25 provided on its inner surface and substantially at right angles thereto, with a web 26. The flange overlaps the web at both ends and likewise said flange inclines toward the web at its ends. This construction is convenient for the mounting of the brake lining which, in this instance, consists of any suitable lining 27 having a metal backing, the metal backing being returnedly bent at its ends so as to grip both ends of the flange. The web at one end is extended and provided with a boss 28. What would be termed the opposite end of the web merges into an elongated arm 29 terminating with a boss 30. The boss 30 is adapted to be fitted upon the stud 10 and the boss 28 upon the stud 14. The other brake shoe has its boss 28 fitted upon the stud 9 and the boss 30 upon the stud 15. It will be noted that the arms 29 of both brake shoes have the boss portions engaging what may be termed the inner studs of the arms 4 and 5, that is, the studs 10 and 15. This arrangement is purely arbitrary and depends upon the direction of movement of the lever 2. In the present instance, movement of the lever 2 anti-clockwise in the showing of Figure 4, causes clockwise rotation of the levers 4 and 5. Thus, the studs on said levers, namely, the studs 14 and 15 for one lever, and 9 and 10 for the other, rotate clockwise relative to the shafts 16 and 18, causing the brake shoes to move radially outwardly and into engagement with the brake drum. Any shape of arm 29 may be resorted to so long as the arrangement is such that equal travel of the entire brake shoe is made. The shape shown in Figure 7 is largely utilized to accommodate other mechanism of the brake and so as to keep the arms 29 out of the way of further lever members to be described.

It is evident that some means must be provided for maintaining the links 18 and 19 in working relation to the levers 3, 4 and 5, and I accomplish this through the medium of the guard 31 shown in Figures 12 and 13. This guard is provided with two spaced face portions, one face portion being secured as shown at 32 to the carrier plate, while the other face portion overlies the links 18 and 19. This construction and arrangement is best shown in Figure 3.

The parts so far described, with the exception of the drum and the carrier plate, constitute the primary braking system.

The secondary brake system will next be described. This system is illustrated in part in Figures 6, 8 and 11. This system includes levers 50 and 51, one end of both of which is provided with a stud as shown at 52 and 53, and the opposite ends of said levers both have a squared opening as shown for the respective levers at 54 and 55. The lever 51 is provided with a perforated lug or ear 56. A shaft 57 carries an arm 58 (see Figure 12). This arm is provided with a stud 59. A link 60 receives the studs 53 and 59, and a link 61 receives the studs 52 and 59. In this manner, the levers are associated with the arm 58, whereby rotation of the shaft 57 will cause movement of said arms. It will be noted that the shaft 57 is passed directly through the hollow shaft or tubular shaft 1 and that said shaft 57 has keyed thereto an operating lever 62. This lever may be connected directly to the emergency brake lever. It will be remembered that the end 7 of the lever 4 of the primary actuating member as well as the lever 5, are both provided with tubular shaft portions, as shown in Figures 9 and 10. Adapted to be received in said tubular shaft portions are further shaft members 63 and 64. Said shafts both are provided with cross arms or lever members 65 and 66, and said lever portions are provided with depending studs equidistantly spaced relative to the shaft, as shown for the member 65 at 67 and 68 and the member 66 at 69 and 70. Both shafts are provided with a portion which is substantially square in cross section, as shown at 71, and it will be noted that where the shaft is passed through the hollow shafts 8 and 16 that this portion is reduced in diameter so that the squared portion shoulders upon a part of the levers 4 and 5, as shown for instance at 72. The squared portions of the shafts are passed through the squared openings of the levers 50 and 51 in the manner shown in Figure 11. Thus, when the levers 50 and 51 are moved, the shaft is rotated. The secondary brake shoes are shown at 73 and 74. These brake shoes are similar in construction to the brake shoes of the primary system, in that they are substantially the same size and similarly constructed. Both secondary shoes are alike as to construction; hence, one thereof will be described.

Both shoes include a segmental curved flange 75 provided with a central web 76, one end of said web being extended as shown at 77 and provided with a boss 78. The opposite end of said web merges into an elongated and curved arm 79 terminating with a transverse boss 80. The flange 75 overlaps ends of the web 73 with the flange inclined relative to the general curved face portion, as shown at 81 and 82. A brake lining 83 is carried upon the face of the flange, the brake lining having returnedly bent ends, as shown at 84 and 84a, whereby the brake lining is firmly secured to the flange. The remarks relative to this lining as described for the primary shoes likewise apply here. The general curvature of the extended arm 79 also depends upon the brake construction and the best manner of accommodating the various elements within the drum. It will be noted upon reference to Figure 8 that the brake shoes are arranged diametrically opposite and that the boss 78 of one shoe is received upon the stud 67 while the arm 79 of the other shoe has the boss 80 thereof carried upon the stud 68. The stud 69 cooperates with the boss of the other shoe arm 79 and the stud 70 with the boss 78. A coil spring 85 is secured to the perforated lug or ear 56 and to the pin 22. Thus, the lever 51 is urged to rotate in an anti-clockwise direction, considering the plane of Figure 8, and such movement maintains the brake shoes out of engagement with the drum. If now, the lever 62 is moved as shown in Figure 4 which will cause anti-clockwise rotation of the arm 58, the brake shoes 73 and 74 will be brought into engagement with the drum, as shown for the shoe 73 in Figure 4.

I have thus far described the primary and secondary brake systems. I will now describe the combination of both systems whereby the secondary system may be operated alone or both the primary and secondary systems operated together.

Assuming that the primary system has been assembled, as shown in Figure 7, I next assemble the secondary system, and the elements will then appear as shown in Figure 2. In order to separate the studs 69 and 70 from the studs 9 and 10, as well as the studs 67 and 68 from the studs 14 and 15, I have provided discs 86 and 87, said discs being carried upon the shafts 63 and 64 as shown in Figure 10 for one of the shafts. Each disc not only acts to maintain the studs separated but acts to hold the arms of the different brake shoes on the studs. Each set of shafts 8 and 63 is held in cooperative working relation through the medium of a clip 88 external the carrier plate. This clip is U-shaped in form and is secured to the shaft 63 by being received in grooves of said shaft, as shown at 89. This clip overlaps the end of the shaft 8 and likewise overlaps a portion of a flange 90 projecting from the outer surface of the carrier plate. It is evident that other means might be resorted to for holding the parts in position of assemblage although this system has proven satisfactory. The flange 90 may be externally threaded, as shown at 91, to receive a cap 92. The usual oil opening 93 may be provided in the shaft 63 and which oil opening communicates with the studs 67 and 68; likewise said opening 93 communicates with oil openings 94 for the shaft 8 as well as with cross oil openings 95 leading to the surface of the studs 14 and 15. The construction would be the same for the opposite side, to-wit, shafts 16 and 64 as well as the studs 9 and 10 and studs 69 and 70. High pressure nipples of the character shown in Figure 9 at 96 may be directly connected to the shafts 63 and 64 whereby oil or other substance may be forced through the oil openings. Thus, all movable parts within the drum may be lubricated by external application of an oil pressure gun.

In the assemblage of the brake units, the levers 50 and 51 respectively overlie the levers 5 and 4 in such position that the stops 11 and 24 may contact with the respective overlying levers of the secondary system (see Figure 4).

It is now evident that the two systems combined may provide and in fact do provide in the present instance, although as stated to begin with, I do not wish to be restricted to any given number of brake shoes, four shoes adapted to cooperate in diametric pairs. In other words, the primary system consists of two brake shoes diametrically arranged and the secondary system does likewise. The guard 31 which has heretofore been described, acts to separate the arms 3 and 58 and the links 18 and 19, 60 and 61. Likewise, said guard aids in holding the parts in assemblage and so that the studs do not leave the boss portions of the links. Hence, it is an easy matter to assemble the present brake because it is only necessary to lock two shafts by a simple clip arrangement and to provide the guard 31 for other parts of the brake system. Thus, the brake is a built-up structure.

The take-up mechanism c which has been before mentioned, consists of a rack and pawl and is best illustrated in Figures 14 to 17, inclusive. For convenience of illustration, the carrier plate is shown as provided with a rack 100. This rack comprises a plurality of spaced, slightly curved projections or teeth 100a, and the pawl 101 is carried by the lever 5, the lever 5 to this end being formed with a pair of spaced brackets 102 and 103 with the pawl 101 carried on a pin 104 between said brackets. This pawl is conventional in construction, consisting of an elongated part 105 for engagement between the projections or teeth 100a. A spring 106 acts to maintain the pawl in engagement with the teeth or projections. It will be noted that the rack is slightly curved, as best shown in Figure 14. This rack is made this way to accommodate for movement of the arm and so that the pawl will at all times engage the teeth or projections 100a. Each tooth or projection is relatively thin and so arranged that when the pawl passes beyond the confines or end of one of the teeth that the pawl will then be received in a pocket or spaced portion between said tooth and the next following tooth. When the brake lining is new, it will have a certain thickness, as shown in Figure 15, and it will be seen that the lever 5 may move a given distance to bring the shoe into engagement with the brake band. However, as the lining wears the lever is forced to move more and more in a given direction in order to bring the brake lining into engagement with the drum until a point is reached where the pawl will pass over and beyond the periphery of the tooth shown at 107, whereupon when the lever is moved so as to release the brake shoe from the brake drum, the pawl will be received in the space directly under the tooth 107 to the position shown in Figure 17. When the arm 3 moves anti-clockwise from the showing of Figure 5, the levers 4 and 5 rotate in a clockwise direction. The normal return for said levers 4 and 5 when the brake pedal is released, would be to the position shown in Figures 2 and 15. However, as the brake lining wears, the arm 5 does not return to the same position due to the fact that the pawl will engage a following tooth, as before described, and as for instance illustrated in Figure 17. This, of course, will prevent the lever 4 from returning to the position of Figure 5 and the arm 3 will not swing as far.

The operation, uses and advantages of the invention are as follows:

If we assume that the brake has been assembled so that both the service and the secondary units are in place and the levers 2 and 62 connected through the usual linkage to an equalizer and thence to the service brake for the lever 2 and the emergency brake for the lever 62, I have provided a system whereby the brake pedal will operate the service system and cause all of the brake shoes to move into engagement with the brake drum when the foot pedal is depressed. On the other hand, if the emergency brake is operated, two of said brake shoes will operate. It is evident that the arrangement of the studs 14 and 15 for the lever 5 and the studs 9 and 10 for the lever 4 is such as to provide one form of crank arm in that rotation of said arms occurs about the hollow shafts 8 and 16 journaled in the carrier plate. Likewise, it is evident that the cross arms 65 and 66 also function as cranks, due to the position of the studs carried thereby, which studs act to cause movement of brake shoes associated therewith. When the secondary lever 62 is moved, the shaft 57 is rotated which in turn will cause rotation of the crank arm 58. This crank arm in turn will move the links 60 and 61 and cause movement of the levers 50 and 51 from what may be termed their normal position, being the position wherein the brake shoes are out of contact with the brake drum. The levers 50 and 51 will rotate in a clockwise direction from the showing of Figures 6 and 8 and against tension exerted by the spring 85. When the lever 2 of the primary system is moved in an anti-clockwise direction from the showing of the different figures, the shaft 1 is rotated which will cause clockwise rotation of the levers 4 and 5, the levers being moving against tension exerted by the spring 23.

Now, from what has just been stated, in order to cause the secondary brake system to operate, the levers 50 and 51 must move in a clockwise direction and in order to operate the primary brake system, the levers must move in the same direction, to-wit, clockwise. Therefore, in order to move the secondary levers when the primary levers 4 and 5 are actuated, it is evident that some means must be provided and this is accomplished by the stops 11 and 24, by the stop 11 contacting with the upper edge of the lever 50 and the stop 24 with the lower or inner edge of the lever 51, with the result that all of said levers are moved simultaneously when the lever 2 is operated. Hence, all of the brake shoes will move outwardly against the brake drum simultaneously and in equal amounts. It is, of course, understood that so far as actual movement is concerned, it is essential that there be a proper balancing of the parts so that the degree of movement is equal but this is mere mechanical practice of the character that any mechanic can readily accomplish. When the lever 62 is released, the coil springs 23 and 85 tend to rotate both lever systems in an anti-clockwise direction and restore the brake shoes to what may be termed the normal position or out of contact with the brake drum. The take-up mechanism c by preventing the lever 5 from returning to an initial position will, of course, affect all of the other levers of both primary and secondary systems because the lever 5 is directly linked with the lever 4 and the stop 24 would affect the lever 50 and the lever 50 is directly linked with the lever 51.

It will be noted that the arms 65 and 66 of the secondary system are substantially 90° to the position of the studs 9 and 10 and 14 and 15 of the levers 4 and 5. This arrangement is purely arbitrary but it is convenient from a space standpoint.

A brake of this character allows an equal expansion of all the brake shoes with the result that a vehicle provided with this character of brake functions efficiently due to the fact that the entire brake lining is brought into play against the brake drum. High spots are done away with and it is only essential that the brake drum be substantially a true circle. One of the chief causes of skidding is due to unequal brake pressure but it is evident that this is effectively overcome with the present brake because if two brakes are utilized and both sides equalize through a suitable mechanism, both brakes will act evenly. Because the brake shoes all operate through the same degree of arc and with equal pressure against the brake drum, the lining will be evenly worn and hence frequent renewal of the lining is unnecessary as is the case where the lining only contacts with certain portions of the drum, which is usually the case with the average brake now on the market, and particularly that type of brake which depends upon some member initially frictionally engaging the drum to in turn carry other members into braking contact with the drum, the first member getting the most wear.

The brake is comparatively simple, most parts being capable of die casting, with only one part subject to breakage, namely, the springs, but if proper strength and tempered springs are used, breakage at this point is not likely. However, it is within the purview of my invention to place the springs externally of the carrier plate so that the springs can be inspected. It is evident, however, that even if a spring does break, that this will not affect operation of the brake because the foot pedal or emergency lever through the different linkage and levers actually controls the brake shoe movement, and if the brake shoes are released from the drum, obviously they will move away from the drum regardless of whether the springs 23 and 85 are present or not.

The different movable parts of the brake are readily lubricated in the manner before set forth and shown in Figures 9 and 10.

It is obvious that various changes and modifications and variations may be made in practicing the invention in departure from the particular showing of the drawings without however, departing from the true spirit thereof.

I claim:

1. In a brake, a brake drum, a carrier plate, primary levers rotatably secured to said carrier plate, a pair of brake shoes carried by the primary levers and whereby when said primary levers are rotated in one direction, said brake shoes are moved into drum engagement, a pair of diametrically opposed secondary brake shoes, secondary levers swingingly secured to the carrier plate, and means whereby movement of the primary levers causes movement of the secondary levers to move all of said brake shoes into drum engagement.

2. In a brake, a carrier plate, bearing portions diametrically arranged in said carrier plate, tubular shafts in said bearing portions, both said shafts being provided with a cross arm having spaced studs, and a pair of diametrically disposed brake shoes, both brake shoes being provided at ends thereof with boss portions adapted to be carried between the cross arms and on a stud thereof.

3. In a brake, a carrier plate, bearing portions diametrically arranged in said carrier plate, tubular shafts in said bearing portions, both said shafts being provided with a cross arm having spaced studs, a pair of diametrically disposed brake shoes, both brake shoes being provided at ends thereof with boss portions adapted to be carried between the cross arms and on a stud thereof, links between said shoes, and a crank arm secured to said links whereby when the crank arm is moved, movement is produced in said shoes.

4. A secondary brake system including a pair of levers, a crank, links between the crank and said levers for producing rotation of said levers, independent shafts for both said levers, said shafts being provided with a cross arm formed with a pair of studs, and a pair of diametrically disposed brake shoes provided at ends with boss portions.

5. A secondary brake system including a pair of levers, a crank, links between the crank and said levers for producing rotation of said levers, independent shafts for both said levers, said shafts being provided with a cross arm formed with a pair of studs, and a pair of diametrically disposed brake shoes provided at ends with boss portions, an end of each brake shoe engaging studs on opposite cross arms.

6. In a brake, a carrier plate, bearing portion diametrically arranged in said carrier plate, tubular shafts in said bearing portions, both said shafts being provided with a cross arm having spaced studs, a pair of diametrically disposed brake shoes, both brake shoes being provided at ends thereof with boss portions adapted to be carried between the cross arms and on a stud thereof, links between said shoes, and a crank arm secured to said links whereby when the crank arm is moved, movement is produced in said shoes; a secondary brake system including a pair of levers pivoted to the carrier plate, a crank, links between the crank and said levers for producing rotation of said levers, independent shafts for both said levers, said shafts being provided with a cross arm formed with a pair of studs, a pair of diametrically disposed brake shoes provided at ends with boss portions, an end of each brake shoe engaging studs on opposite cross arms, and means carried by the first shoes adapted to engage the secondary levers when said first shoes are moved to thereby cause movement of said secondary levers to in turn cause movement of all said brake shoes.

7. In a brake, a carrier plate, bearing portions diametrically arranged in said carrier plate, tubular shafts in said bearing portions, both said shafts being provided with a cross arm having spaced studs, a pair of diametrically disposed brake shoes, both brake shoes being provided at ends thereof with boss portions adapted to be carried between the cross arms and on a stud thereof, and means associated with one of said shoes for controlling the degree of turning movement of said shoes.

8. In a brake, a carrier plate, bearing portions diametrically arranged in said carrier plate, tubular shafts in said bearing portions, both said shafts being provided with a cross arm having spaced studs, a pair of diametrically disposed brake shoes, both brake shoes being provided at ends thereof with boss portions adapted to be carried between the cross arms and on a stud thereof, links between said shoes, and a crank arm secured to said links whereby when the crank arm is moved, movement is produced in said shoes; a secondary brake system including a pair of levers pivoted to the carrier plate, a crank, links between the crank and said levers for producing rotation of said levers, independent shafts for both said levers, said shafts being provided with a cross arm formed with a pair of studs, a pair of diametrically disposed brake shoes provided at ends with boss portions, an end of each brake shoe engaging studs on opposite cross arms, means carried by the first shoes adapted to engage the secondary levers when said first shoes are moved to thereby cause movement of all said brake shoes; and means associated with one of said shoes for controlling the degree of turning movement of said shoes.

HARRY D. VAN BRUNT.